US006721557B1

(12) United States Patent
Ritter

(10) Patent No.: US 6,721,557 B1
(45) Date of Patent: Apr. 13, 2004

(54) METHOD FOR DETERMINING THE QUALITY OF MOBILE RADIOTELEPHONE UNITS IN A MOBILE RADIOTELEPHONE NETWORK

(75) Inventor: Rudolf Ritter, Zollikofen (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 09/646,458

(22) PCT Filed: Mar. 17, 1999

(86) PCT No.: PCT/CH99/00120

§ 371 (c)(1),
(2), (4) Date: Sep. 19, 2000

(87) PCT Pub. No.: WO99/48316

PCT Pub. Date: Sep. 23, 1999

(30) Foreign Application Priority Data

Mar. 19, 1998 (CH) .............................................. 0668/98

(51) Int. Cl.[7] .............................................. H04Q 7/20
(52) U.S. Cl. ..................... 455/423; 455/67.1; 455/67.3; 455/67.7; 455/456
(58) Field of Search ............................. 455/67.3, 67.1, 455/67.7, 423, 456, 415

(56) References Cited

U.S. PATENT DOCUMENTS

| 5,355,514 | A | * | 10/1994 | Borg ........................... 455/423 |
| 5,490,204 | A | | 2/1996 | Gulledge |
| 5,570,373 | A | * | 10/1996 | Wing ........................... 455/423 |
| 5,644,623 | A | | 7/1997 | Gulledge |
| 5,694,451 | A | | 12/1997 | Arinell |
| 5,706,333 | A | | 1/1998 | Grenning et al. |
| 5,752,193 | A | * | 5/1998 | Scholefield et al. .......... 455/452 |
| 5,812,636 | A | * | 9/1998 | Tseng et al. ................. 455/423 |
| 5,987,320 | A | * | 11/1999 | Bobick ........................ 455/423 |
| 6,185,419 | B1 | * | 2/2001 | Sasin et al. .................. 455/423 |
| 6,201,971 | B1 | * | 3/2001 | Purnadi et al. .............. 455/450 |
| 6,430,397 | B1 | * | 8/2002 | Willrett .................... 455/67.11 |
| 6,445,916 | B1 | * | 9/2002 | Rahman ..................... 455/423 |
| 6,529,594 | B1 | * | 3/2003 | Brockman et al. .......... 379/133 |

FOREIGN PATENT DOCUMENTS

| EP | 0431956 | 12/1991 |
| WO | WO96/07288 | 3/1996 |

* cited by examiner

*Primary Examiner*—Nay Maung
*Assistant Examiner*—Sujatha Sharma
(74) *Attorney, Agent, or Firm*—Pillsbury Winthrop LLP

(57) ABSTRACT

For each connection in a mobile radio network, at least one quality parameter is determined. A server (6) in a mobile radio network (7) calculates at least one statistical quality indicator ($p_i$) from quality parameters of multiple connections of a user, as well as at least one quality criterion (G, $G_i$), which depends on a plurality of connections with different mobile devices (1).

Based on the determined quality indicators, the server (6) decides which mobile devices (1) do not fulfil the quality criteria (G, $G_i$) and must be rated as critical. The user of a mobile device, which does not fulfil one or more established quality criteria, is informed by means of an indication in his telephone bill.

The quality parameters are determined in the base stations (2) of the mobile radio network (7) and collected in said server (6).

The method may also be applied to the determination of the quality of components of the infrastructure, for example base stations (2).

9 Claims, 3 Drawing Sheets

|   |   | BS |   |   |   | P.j |
|---|---|---|---|---|---|---|
|   |   | BS1 | BS2 | ... | BSK |   |
| M S | MS1 | $a_{11}$<br>$b_{11}$<br>$t_{11}$<br>$p_{11} = a_{11}/t_{11}$ | $a_{12}$<br>$b_{12}$<br>$t_{12}$<br>$p_{12} = a_{12}/t_{12}$ | ... | $a_{1K}$<br>$b_{1K}$<br>$t_{1K}$<br>$p_{1K} = a_{1K}/t_{1K}$ | $P_1$ |
|   | MS2 | $a_{21}$<br>$b_{21}$<br>$t_{21}$<br>$p_{21} = a_{21}/t_{21}$ | $a_{22}$<br>$b_{22}$<br>$t_{22}$<br>$p_{22} = a_{22}/t_{22}$ | ... | $a_{1K}$<br>$b_{1K}$<br>$t_{1K}$<br>$p_{2K} = a_{2K}/t_{2K}$ | $P_2$ |
|   | . | . | . | . | . | . |
|   | MSN | $a_{N1}$<br>$b_{N1}$<br>$t_{N1}$<br>$p_{N1} = a_{N1}/t_{N1}$ | $a_{N2}$<br>$b_{N2}$<br>$t_{N2}$<br>$p_{N2} = a_{N2}/t_{N2}$ | ... | $a_{NK}$<br>$b_{NK}$<br>$t_{NK}$<br>$p_{NK} = a_{NK}/t_{NK}$ | $P_N$ |
|   | P.j | $p_{.1}$ | $p_{.2}$ | ... | $p_{.k}$ | $p_{..}$ |

FIG. 2

METHOD FOR DETERMINING THE QUALITY OF MOBILE RADIOTELEPHONE UNITS IN A MOBILE RADIOTELEPHONE NETWORK

This application is the national phase of international application PCT/CH99/00120 filed Mar. 17, 1999 which designated the U.S.

The present invention relates to a method for determining the quality achieved by different mobile devices in a mobile radio network, for example in a digital mobile radio network.

The quality of communication in a mobile radio network depends on the quality of its infrastructure, including the base stations and other fixed components of the network, as well as on the quality of the mobile devices used, for instance mobile telephones. Since mobile devices are consumer goods offered by various manufacturers in different price categories, they may be of very different quality. Moreover, the quality of communication depends on the installation of these mobile devices. For example, if a mobile telephone is used in a car with tinted windowpanes, the quality may be improved greatly if an exterior antenna is used.

In general, a network operator attempts to ensure a minimum level of quality for all his subscribers. Therefore, the requirements on the infrastructure must be adapted to those mobile devices used that have the worst quality. This approach does not provide any advantages for mobile devices with a better quality, and is thus a waste of resources. Therefore, the network operator has a strong economic interest in subscribers equipped with bad quality mobile devices exchanging their devices for better ones or in having inefficient installations improved.

The invention follows from this finding and aims at a method for identifying mobile radio users equipped with bad quality mobile devices, in order to arrange for them to exchange their devices or to improve their installations.

According to the invention, a server in the mobile radio network calculates for each mobile device at least one quality indicator from at least a plurality of connections with this mobile device. The user of a mobile device not fulfilling one or more of the quality criteria set will subsequently be informed, for example by means of an indication in his telecommunication bill or by means of an alphanumeric message in his mobile device.

In this way, the user is asked to replace his mobile device or to have it repaired, or to improve the installation, so that it will become easier for the network operator to ensure a minimum level of quality for every user.

The patent document U.S. Pat. No. 5,490,204 describes a method for testing the quality of the infrastructure in a mobile radio network. For that purpose, a test mobile device is used, which carries out different test calls at different points of a mobile radio network, in order to check the quality of various components in the network, for instance different base stations. The test device comprises a laptop computer controlled by an appropriate program and connected to a mobile telephone. An operator with this test mobile device drives through the area covered by the network to measure the quality of connections at different locations in the network. This method does not make it possible to check the quality of terminal devices.

The patent document WO96/07288 describes a system in which the quality of a mobile device is tested during log in. The quality control is based on information from the mobile device, for instance, a signal sent out by the mobile device, which signal contains a code for the type of mobile device. In a variant, the quality is determined by means of a data base of the network operator where the types of all the devices having a subscription to the network are stored. The transmitting power of the base stations as well as the tariffs used are adapted depending on the information provided by the mobile device or by the data base.

In the above method, the quality of the devices is determined once and for all, either in the mobile device or in the data base. Thus, this method does not make it possible to inform the user when the quality of his device is deteriorating, for instance, because of a technical problem or a bad installation.

The present invention will be better understood with the aid of the description, given by way of example and illustrated by means of the appended figures:

FIG. 2 shows a table in which the server collects quality parameters.

Figure 1:
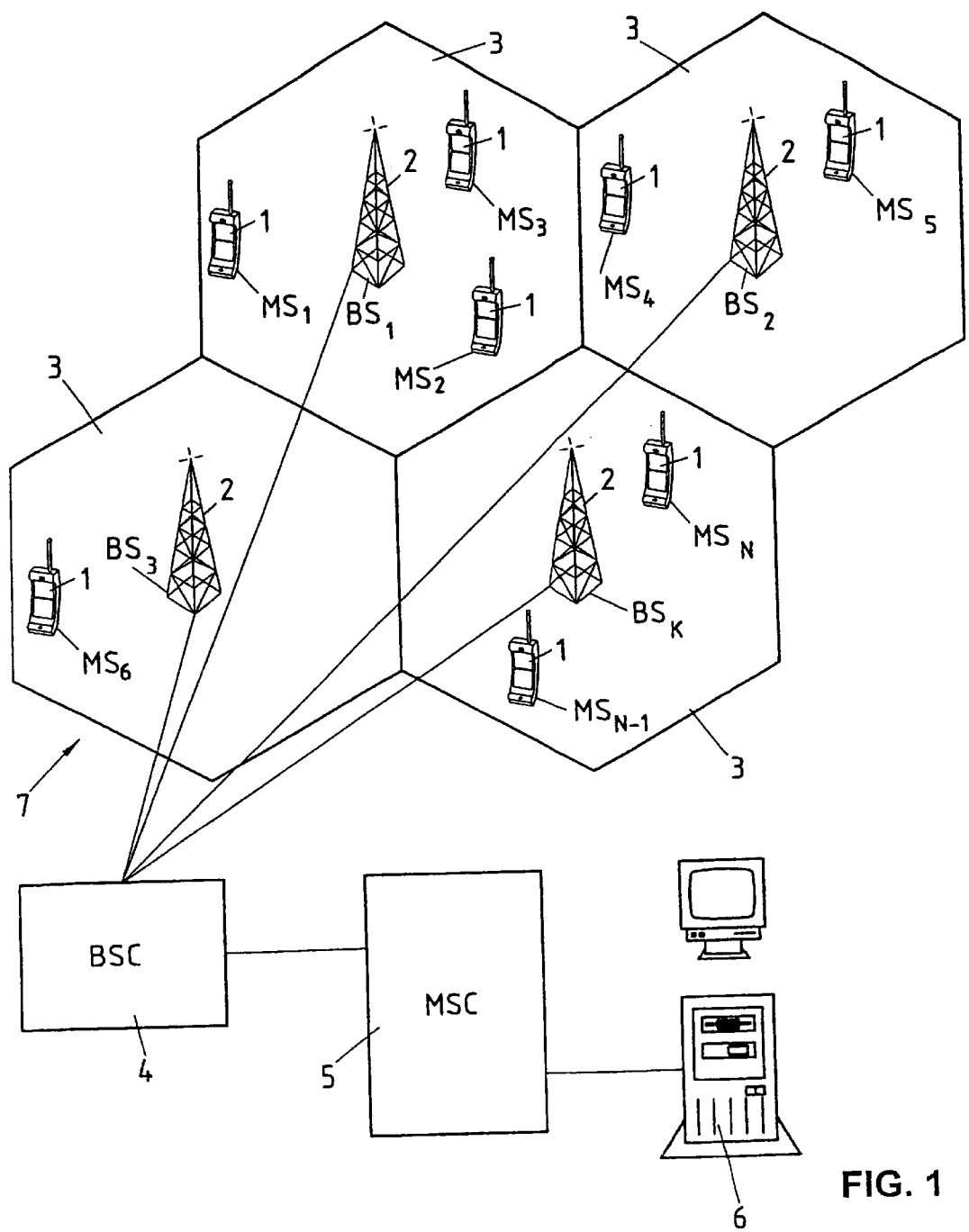
FIG. 1 shows a schematic view of a mobile radio network according to the invention, in which a server determines the quality achieved by different mobile devices.

In FIG. 1, the basic structure of a mobile radio network 7 is shown, for instance a mobile radio network operating according to the GSM standard. The whole area maintained by a network operator is covered by K adjacent and overlapping radio cells 3. In each radio cell 3 there is a base station 2 (BS), which is responsible for supplying N terminal devices 1 (mobile stations, MS) with radio signals. The terminal devices can be, for instance, mobile radio telephones.

The reference numeral 4 refers to a controller (base station controller, BSC) which controls multiple base stations. For example, the controller 4 is responsible for the technically trouble-free switch-over of a user from a radio cell 3 to another neighboring radio cell. Based on automatically performed measurements of field strength, the controller decides when and to which neighboring radio cell the transition from a radio cell is to be initiated. Such a transition is called handover.

Various controllers 4 are grouped for their part in a superordinate mobile switching center 5. This center handles the transition to a wired network, which is not illustrated.

The reference numeral 6 refers to a server, which determines the quality achieved by different mobile devices in the mobile radio network, as will be described later.

The N mobile devices $MS_1$ to $MS_N$ attempt to establish an unknown number of connections via the K base stations $BS_1$ to $BS_K$. Each connection may or may not be successful. For instance, an unsuccessful connection is a terminated connection, which was not terminated by either one of the two participating users.

Each base station determines for each connection or for each attempted connection with a mobile device 1 at least one quality parameter indicating the quality of this connection. For example, the quality parameter is a binary value indicating success or failure of the connection. In a variant, the quality parameter could comprise more detailed information; for example, it could comprise multiple bits indicating different parameters of the connection, for instance the level of the received signal, the signal-to-noise ratio, etc.

The quality parameter(s), determined for a connection and including an identification of the mobile device 1, are transmitted by the controller 4 (BSC) and the mobile switching center 5 to the server 6. The identification of the mobile device comprises, for example, the international mobile subscriber identity (IMSI). The transmission of these quality parameters between the base stations 2 and the server 6 may be performed after each connection, for example within the standardized call detail records (CDR), which are transmitted in a GSM mobile radio network for billing purposes after each connection. A transmission of data concerning different connections is also possible in batch mode, the applied transmission method being subject to implementation according to the structure of the respective mobile radio network.

Server 6 collects quality parameters received from different base stations $BS_1$ to $BS_K$ in the mobile radio network, and groups said quality parameters in a table, of which an example is shown in FIG. 2. This table contains the quality parameters collected during a predefined time interval, for example during one day, a week, a month, or since the time the method according to the invention came into effect. Each row in the table corresponds to a particular mobile device $MS_1$ to $MS_N$, while each column corresponds to a particular base station $BS_1$ to $BS_K$. Each field in the table contains four numbers.

$a_{ij}$  Number of successfully established connections from $MS_i$ to $BS_j$.
$b_{ij}$  Number of connections from $MS_i$ to $BS_j$ not successfully established.
$t_{ij}$  Total number of attempted connections from $MS_i$ to $BS_j$ (t=a+b).
$p_{ij}$  Success rate from $MS_i$ to $BS_j$ ($p_{ij} = a_{ij}/t_{ij}$)

The last column contains the overall success rate $p_{i.}$ of $MS_i$ (over all base stations); $p_{i.}$ depends on the proportion of connections successfully carried out by $MS_i$ and, thus represents a quality parameter for this mobile device. The last row contains the overall success rate $p_{.j}$ of $BS_j$ (over all mobile devices); $p_{.j}$ depends on the proportion of connections successfully carried out by $BS_j$ and, thus represents a quality parameter for this base station. The last field $p_{..}$ contains the overall success rate (over all mobile devices and all mobile stations) and depends on the quality of the whole mobile radio network 7.

Preferably, the mean values of the success rates weighted by their respective number of occurrences are used as overall success rates, so that extreme success rates of individual base stations used less frequently do not influence the result too much:

$$p_{i.}=(t_{i1}\times p_{i1}+t_{i2}\times p_{i2}+t_{ij}\times p_{ij}+\ldots+t_{iK}\times p_{iK})/(t_{i1}+t_{i2}+t_{ij}+\ldots+t_{iK})$$

$$p_{.j}=(t_{1j}\times p_{1j}+t_{2j}\times p_{2j}+t_{ij}\times p_{ij}+\ldots+t_{Nj}\times p_{Nj})/(t_{1j}+t_{2j}+t_{ij}+\ldots+t_{Nj})$$

Other mean values may also be used as quality indicators for mobile devices and/or base stations. If the values of $p_{i.}$ or $p_{.j}$ vary quickly, a moving average may be more appropriate.

So far, with the overall success rate $p_{i.}$ and $p_{.j}$ in Table 2, we have defined an appropriate quality indicator for the mobile devices $MS_1$–$MS_N$ and for the base stations $BS_1$–$BS_K$. Yet, it is necessary to establish a criterion to decide which component may be rated as critical or non-critical. Thus, with the aid of FIG. 3, we will now describe a possible method, which may be executed by server 6 to rate mobile devices and base stations.

Figure 3:
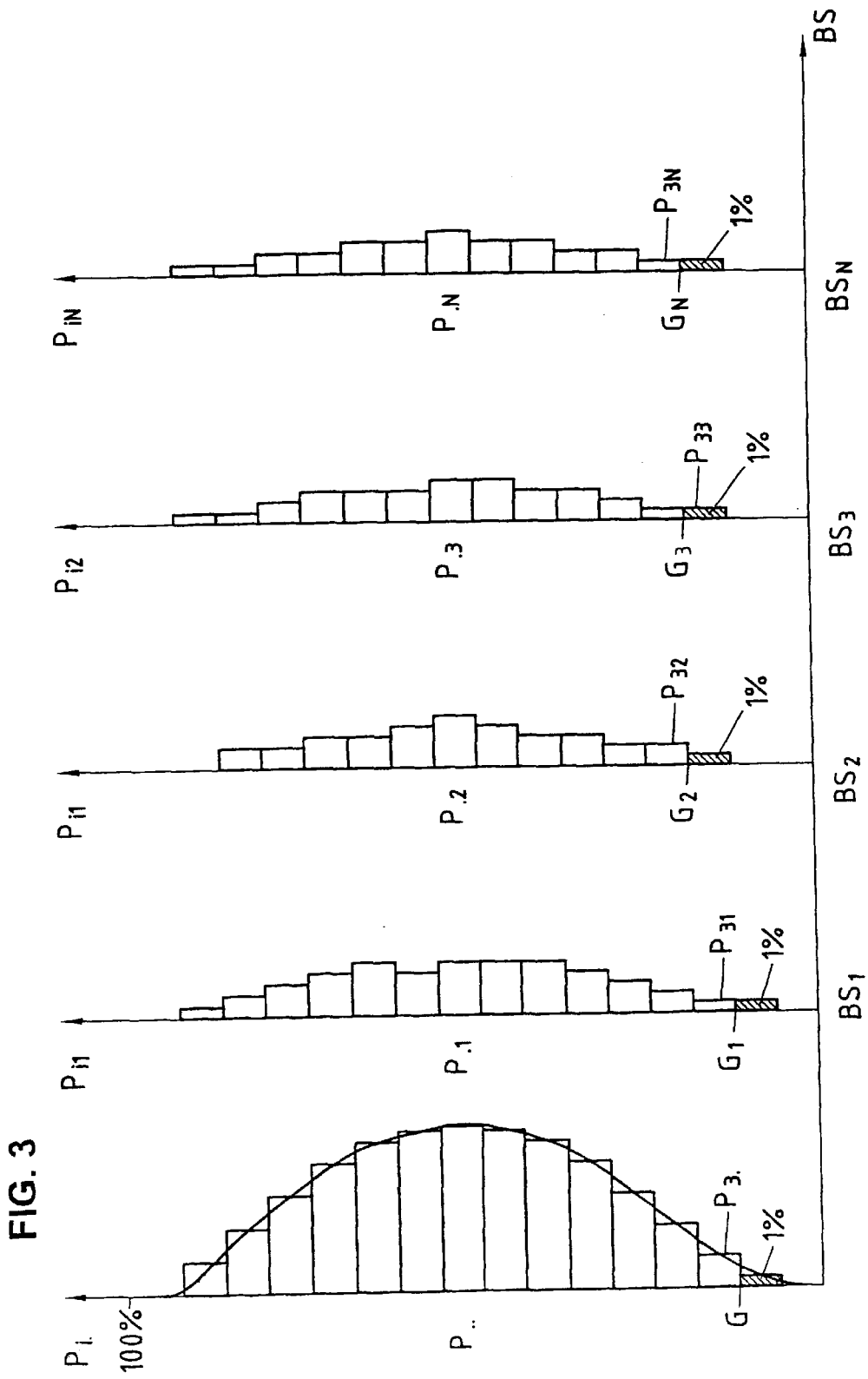
FIG. 3 shows a schematic diagram of a possible method for determining of quality of mobile radio devices and base stations in a mobile radio network.

The achieved success rates $p_{ij}$ of the mobile devices $MS_i$ to the base stations $BS_j$ are viewed as individual events in a time interval. FIG. 3 shows the distribution of the success rates of the mobile devices $MS_i$ over all the base stations $BS_j$. For instance, the axis $BS_1$ shows the success rate $p_{i1}$ achieved by the different mobile devices $MS_1$ to $MS_N$ via the base station $BS_1$. The axis $p_{i.}$ shows the distribution of the weighted mean success rates of the different mobile devices $MS_1$ to $MS_N$ as defined above.

The limiting value G is used as the rating criterion. If the overall success rate $p_{i.}$ of a mobile device $MS_i$ (over all base stations) is smaller than G, this respective mobile device is rated as critical. For instance, a quantile of the distribution of all success rates $p_{i.}$ may be used as the limiting value. In the example illustrated, the program in server 6 always rates one percent of the mobile devices $MS_i$ with the smallest overall success rates $p_{i.}$ as critical. A fixed limiting value may also be used. In the latter case, mobile devices which do not reach a fixed predefined success rate $p_{i.}$, for instance 90%, are rated as critical.

In addition to the global limiting value G, a mobile device quality criteria $G_j$ is preferably defined for each base station. For example, for each base station $BS_j$, a defined proportion (quantile), for instance one percent of the mobile devices which have achieved the worst success rate $pi_j$ with this base station, is rated as critical for use with this base station. In FIG. 3, the mobile device $MS_3$, which has a success rate $p_{33}$ smaller than the limiting value $G_3$, is rated as critical in the cell 3, although $MS_3$ is globally uncritical ($p_{3.}>G$). The user of $MS_3$ may then receive an indication that in many locations the use of his device may result in problems. As illustrated, the limiting values $G_i$ may be different for each base station.

FIG. 3 also shows the overall success rates $P_{1j}, P_{2j}, \ldots P_{nj}$ of the base stations $BS_1, BS_2, \ldots BS_n$ (over all mobile devices). A small success rate $p_{.j}$ for a base station means that many connections with this base station are not successful. This may be an indication that there is a problem with this station. Thus, the success rate $p_{.j}$ represents a base station quality indicator. In order to uncover problematic base stations, a limiting value for the success rate $p_{.j}$ of the base stations $BS_1$ to $BS_K$ may be defined, for instance a quantile of the distribution of all the success rates $p_{.j}$. This limiting value may be defined with the same mechanism as the one used for defining the limiting value for the success rate of the mobile devices.

A poor success rate $p_{i.}$, achieved with a particular mobile device, may indicate a bad location rather than a critical mobile device $MS_i$, for instance because the mobile device $MS_i$ is frequently used with a bad base station. In order not to consider connections with base stations identified as being defective in the statistical evaluation of the quality of mobile devices, such connections may be excluded, in a variant, from the table in FIG. 2. Vice versa, critical mobile devices may also be excluded from the evaluation of the quality of the base stations (trimming of extreme values).

The users of mobile devices which are rated critical by this method are informed, for example by means of an automatically written indication in the telecommunication bill. For instance, the user is notified to have his mobile device checked or to improve the installation, for instance with an exterior antenna in his car. Depending on the quality parameters achieved, the indication may be written differently. In a variant, the user may also be informed by means of an electronic message displayed on the display of his device. For that purpose, SMS messages (Short Message System) may be used, for example. In another variant, the user is informed about the state of his mobile device by means of a verbal message, for example spoken by a speech synthesizer.

Although the description only mentions the special case of the quality analysis of mobile devices and base stations, one skilled in the art will understand that the invention may also be applied to the quality evaluation of other components in a mobile radio network, for example cables between base stations, base station controllers, etc. Furthermore, the identification of the mobile devices $MS_1$–$MS_N$ in the table of FIG. 2 may be joined with a data base, providing the identity of the manufacturer and/or the dealer for each mobile device, so that a dealer/manufacturer quality indication may be determined easily.

Furthermore, it is possible to collect quality parameters with more than one bit for each connection, for instance multiple binary or non-binary parameters. Thereby, for the price of complicated data processing, the critical components in a network may be determined more reliably and the users or operators may be provided with a more detailed diagnosis of defective devices.

Moreover, one skilled in the art will understand that the present invention may be applied not only to the identification of defective devices in a mobile radio network, but also to the planning of the network, for instance to determine where base stations or other components should be added or replaced.

The statistical methods described are only given as examples and one skilled in the art will understand that other methods for determining critical components in the network may also be applied. Specifically, in order to identify the devices which wear out more rapidly or in order to determine sudden quality losses, for instance after new installations or after the reconfiguration of existing devices, the diagnosis may be based on the time variation of the quality achieved through a particular component. In this case, the user may be informed with a detailed notice, for example: "After the installation of your mobile device, the signal-to-noise ratio decreased by approximately x dB; we recommend having the installation checked by a specialist."

Moreover, important information for the planning of the mobile radio network may be gained if the determined quality parameters are stored in the above-mentioned table in server 6 together with information about the time of the connection. In this case, it is possible to determine statistically the quality of a fixed or mobile component of the mobile radio network as a function of the time of day, or respectively the load on the network or the component.

What is claimed is:

1. A method for determining the quality achieved by different components in a mobile radio network, comprising:
   determining a quality parameter which consists of a binary value indicating the success or failure of a connection through base stations of the mobile radio network for every connection with a mobile device;
   statistically calculating, by a server in the mobile radio network, a mobile device quality indicator of a mobile device from the binary quality parameters of corresponding multiple connections associated with the mobile device, wherein the mobile device quality indicator of the mobile device is determined as the success rate computed based on the proportion of the number of successful connections to the number of attempted connections; and
   determining quality criteria according to a quantile of the distribution of the success rates of the mobile device and/or a predefined limiting value with respect to the success rate, wherein
   a user of a mobile device is informed when the mobile device quality indicator associated with the mobile device does not satisfy the quality criteria.

2. The method according to claim 1, wherein:
   the success rates of a mobile device are determined with respect to individual base stations based on connections made by the mobile device via the individual base stations and/or with respect to all base stations based on connections made by the mobile device via all base stations of the mobile radio network; and
   the quality criteria are determined according to a quantile of the distribution of the success rates determined based on connections made via individual base stations and/or all connections made via all base stations of the mobile radio network.

3. The method according to claim 1, wherein the user of the mobile device that does not satisfy the quality criteria is informed by means of at least one of an indication in the telephone bill, an alphanumeric short message on the mobile device, and a verbal message transmitted to the mobile device.

4. The method according to claim 1, further comprising:
   statistically determining, by the server, at least one component quality indicator with respect to a plurality of components based on quality parameters computed from multiple connections of different users, where an inferior or defective component of a certain type in the mobile radio network can be determined from a component quality indicator associated with the components of the same type.

5. The method according to claim 4, wherein the components include a base station.

6. The method according to claim 5, wherein a decision as to whether or not a mobile device satisfies the quality criteria depends on the component quality indicator associated with the component used by the mobile device.

7. The method according to claim 1, further comprising:
   statistically calculating, by the server for each mobile device with respect to each base station, at least one statistical base-station-specific mobile device quality indicator based on a plurality of connections between each mobile device and each specific base station; and
   informing the user of a mobile device if the base-station-specific mobile device quality indicator with respect to the mobile device does not satisfy certain base-station-specific quality criteria associated with the specific base station.

8. The method according to claim 7, wherein the base-station-specific quality criteria associated with the specific base station are established based on at least one statistical attribute of the plurality of connections with the specific base station.

9. The method according to claim 1, further comprising statistically determining, by the server, a manufacturer quality indicator with respect to a mobile device manufacturer based on quality parameters associated with multiple connections of different users using mobile devices from the manufacturer, wherein the manufacturer quality indicator statistically indicates the quality of the mobile devices from the manufacturer.

* * * * *

UNITED STATES PATENT AND TRADEMARK OFFICE
CERTIFICATE OF CORRECTION

PATENT NO. : 6,721,557 B1
DATED : April 13, 2004
INVENTOR(S) : Ritter

It is certified that error appears in the above-identified patent and that said Letters Patent is hereby corrected as shown below:

<u>Title page,</u>
Item [73], Assignee, should read:
-- [73]   Assignee: Swisscom Mobile AG, Bern (CH) --

Signed and Sealed this

Twenty-second Day of March, 2005

JON W. DUDAS
*Director of the United States Patent and Trademark Office*